Aug. 19, 1958 — P. RAVIGNEAUX — 2,847,877
EPICYCLIC CHANGE SPEED GEAR
Original Filed April 1, 1952 — 2 Sheets-Sheet 1

INVENTOR.
P. RAVIGNEAUX, deceased
BY PIERRE GEORGES RAVIGNEAUX
MARIE JEANNE FRANCOISE RAVIGNEAUX,
Heirs and Representatives,
BY
J. Frederick Bechtel
ATTY.

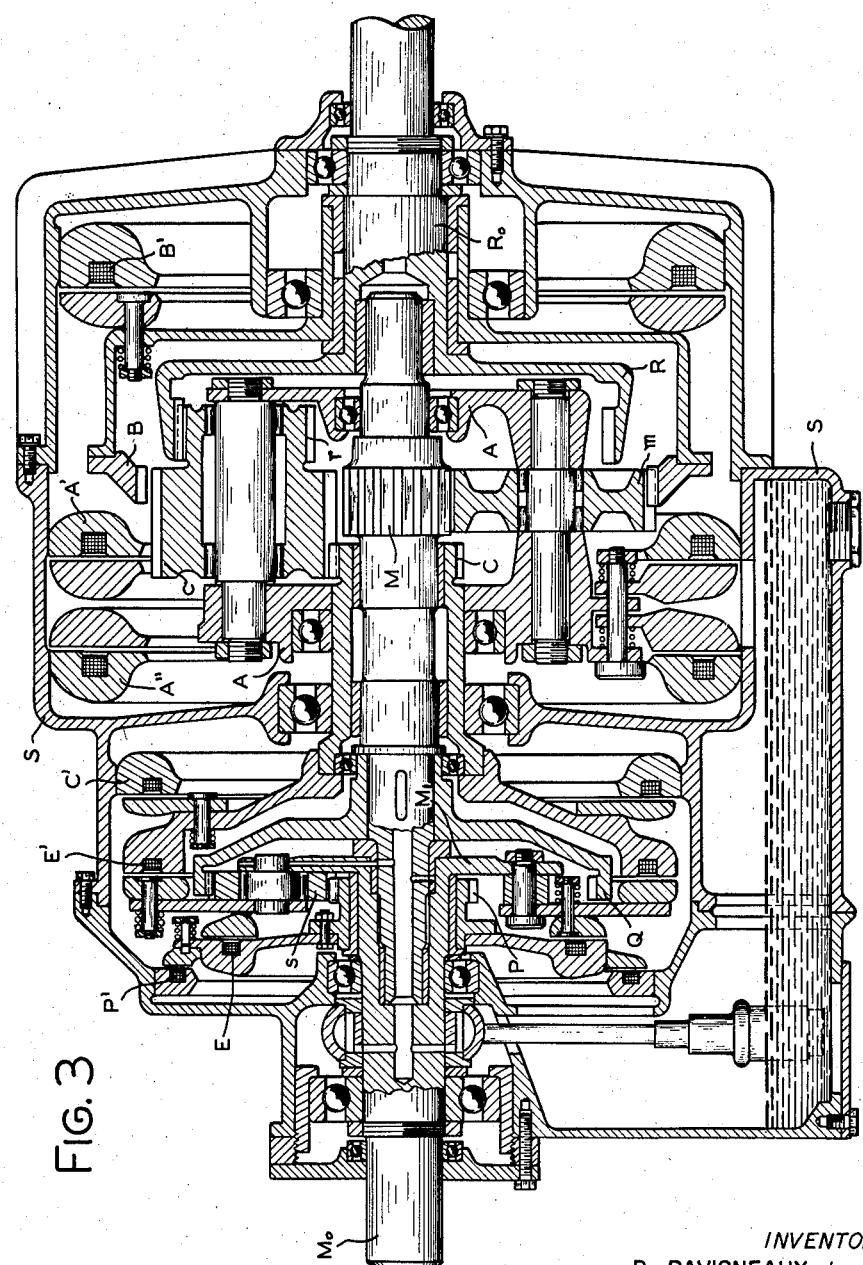

United States Patent Office 2,847,877
Patented Aug. 19, 1958

2,847,877

EPICYCLIC CHANGE SPEED GEAR

Pol Ravigneaux, deceased, late of Neuilly-sur-Seine, France, by Pierre Georges Ravigneaux and Marie Jeanne François Ravigneaux, legal representatives, Neuilly-sur-Seine, France, assignors to Clark Equipment Company, a corporation of Michigan Continuation of application Serial No. 279,841, April 1, 1952, now forfeited. This application August 1, 1956, Serial No. 602,092

Claims priority, application France April 9, 1951

27 Claims. (Cl. 74—759)

This invention relates to epicyclic change speed gears. The present application is a continuation of Serial No. 279,841, filed April 1, 1952.

An object of the invention is to provide a change speed gear comprising, in combination, a main epicyclic assembly including four or five coaxial members such as described, e. g. in the prior Patent No. 2,220,174 and an auxiliary epicyclic assembly mounted in series with said main epicyclic assembly, upstream of the same, and adapted to introduce a premultiplying or demultiplying between the prime driving shaft and said main epicyclic assembly.

When the main epicyclic assembly comprises five coaxial members, said members are constituted by: two central wheels, a planet-carrier, two internal tooth annuli, one of which is fixedly fast in rotation with the ultimate driven shaft, and at least one set of two planet-wheels meshing together and each of which also meshes with one of said central wheels and one of said annuli.

When the main epicyclic assembly only comprises four coaxial members, that annulus which is not fixedly fast in rotation with the ultimate driven shaft is dispensed with.

Another object of the invention is to provide a speed changing device, in which the above mentioned auxiliary epicyclic assembly comprises a first loose sun-wheel, a planet-carrier fixedly fast in rotation with the prime driving shaft and a second sun-wheel fixedly fast in rotation with one central wheel of the main epicyclic assembly.

In the speed changing device described in the above-mentioned patent, the various forward speeds and the back drive were obtained by selectively stopping or holding stationary certain members of the epicyclic assembly and by clutching selectively two members together.

A further object of the invention is to provide a change speed device comprising, in combination, main and auxiliary epicyclic assemblies, in which the stopping and clutching means of the main epicyclic assembly are completed by means to stop the loose sun-wheel of the auxiliary assembly and by means to make directly or indirectly the planet-carrier of the auxiliary assembly rotatively fast with either central wheel of the main assembly.

A single epicyclic assembly comprising four coaxial members permits obtaining three forward speeds and back drive. By adding an auxiliary assembly mounted in series with the main one, there are obtained six forward speeds and two back drive speeds. Similarly, a single epicyclic assembly comprising five coaxial members permits obtaining four forward speeds and back drive; by adding said auxiliary assembly, eight forward speeds and two back drive speeds will be obtained.

In both cases, the ratios provided by each assembly may be so selected as to be distributed within a very progressive range.

Still another object of the invention is to use friction interconnecting means for clutching and braking the various required members.

Still a further object of the invention is to provide a speed changing device of the type described, in which the number of said friction interconnecting means is reduced to five, in the case when the main epicyclic assembly comprises four coaxial members, and to six, in the case when it comprises five coaxial members.

A further object of the invention is to provide an electro-magnetically controlled change speed device of the above mentioned type, each friction interconnecting means being constituted, for that purpose, by an electro-magnet.

Still another object of the invention is to use, in the main assembly of a change speed device of the type described at least one planet-wheel provided with two toothings of different pitch diameters, as described in the co-pending application filed on April 1, 1952.

This last arrangement permits reducing the diametral and axial size of the change speed device.

Other objects and advantages of the invention will be apparent from the following detailed description, together with the accompanying drawings, submitted for purposes of illustration only and not intended to define the scope of the invention, reference being had for that purpose to the subjoined claims.

Figure 4:
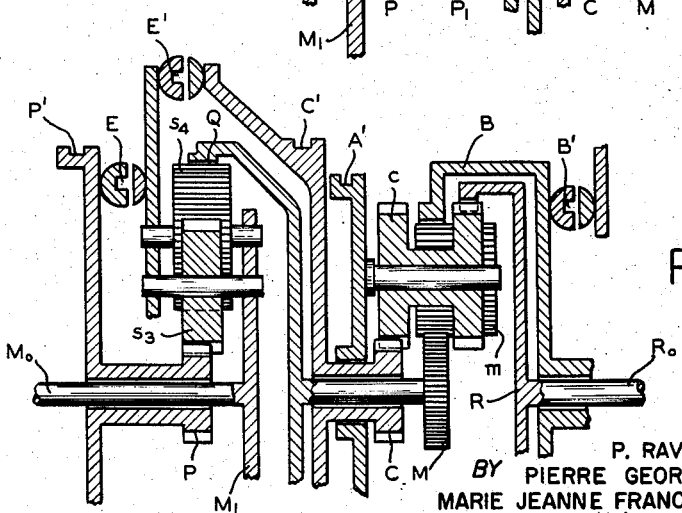

Fig. 3 is an axial sectional view of a preferred constructive embodiment of the speed changing device according to the invention comprising a main epicyclic assembly having five coaxial members and a step planet-wheel, a multiplying auxiliary epicyclic assembly and six control electro-magnets, and Fig. 4 is a diagrammatical axial sectional view of another embodiment of a speed changing device according to the invention, the main epicyclic assembly of which comprises five coaxial members and the auxiliary epicyclic assembly of which exerts a demultiplying action.

In all figures, the corresponding elements have been referred to by the same letters.

As shown in the drawings, the auxiliary epicyclic assembly comprises a planet-carrier $M_1$ directly and fixedly fast in rotation with the prime driving shaft $M_0$, a first sun-wheel constituted in the examples shown by a central pinion P, and adapted to be held stationary by means of a brake constituted by a friction interconnecting device cooperating with a stationary part and a second wheel which is the driven member of the auxiliary assembly and is fixedly fast in rotation with the central wheel M of the main epicyclic assembly.

Assuming that pinion P is held stationary, thanks to the above arrangement the central wheel M is driven at a speed which is the resultant of the speeds of the planet-carrier $M_1$ and the planet-wheel, or planet-wheels, $s$ meshing with the driven wheel rotatively fast with M.

Figure 1:
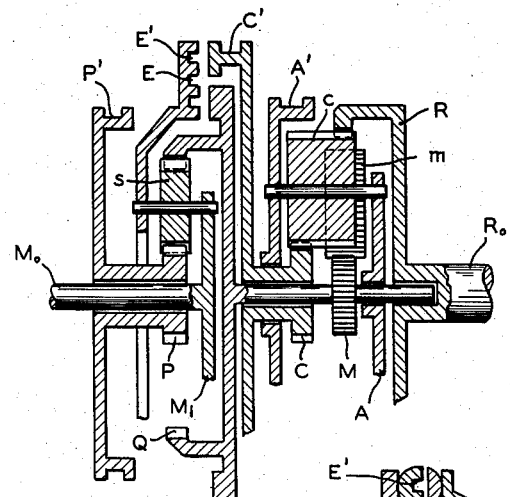
Fig. 1 is a diagrammatical view of a speed changing device according to the invention having four coaxial members and comprising a multiplying auxiliary epicyclic assembly.

In the embodiments shown in Figs. 1 and 3, the driven wheel is constituted by an internal tooth annulus Q and its connection with pinion P is ensured by a planet-wheel $s$ provided with one single spur toothing, or by a plurality of such planet-wheels angularly spaced around pinion P. As a result, the action of said planet-wheel, or planet-wheels, adds with that of the planet-carrier to rotate annulus Q in the same direction as the prime driving shaft $M_0$ and at a higher speed than the latter.

Figure 2:
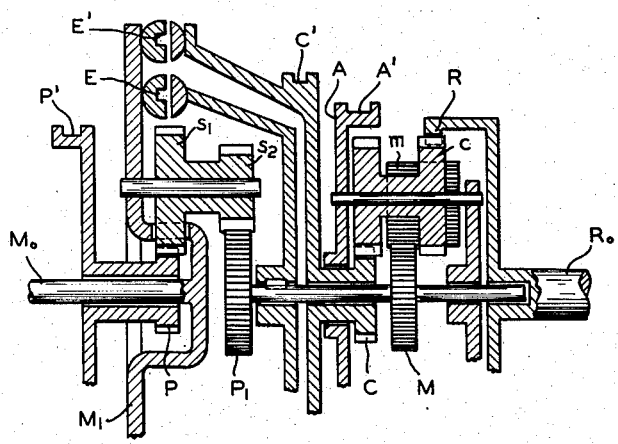
Fig. 2 is a diagrammatical axial sectional view of another embodiment in which the main epicyclic assembly has four coaxial members and in which the auxiliary epicyclic assembly has a demultiplying action.

In the embodiment shown in Fig. 2, the driven wheel of the auxiliary epicyclic assembly is constituted by a second central pinion $P_1$ having a number of teeth higher than the number of teeth of pinion P and the connection between both pinions P and $P_1$ is ensured through a planet-wheel, or a plurality of angularly spaced planet-wheels, provided with two toothings of different pitch diameters, the larger one, $s_1$, of which meshes with pinion P and the smaller one, $s_2$, of which meshes with pinion $P_1$. As a result, the toothing $s_2$ and the planet-carrier $M_1$ act differentially so that pinion $P_1$ is rotated in the same direction as but with a lower speed than the prime driving shaft $M_0$.

Finally, in the embodiment of Fig. 4, the driven wheel of the auxiliary assembly is constituted by an internal-tooth annulus Q, as in the case of Figs. 1 and 3, but its connection with central pinion P is ensured by one or more sets of two planet-wheels meshing together and one of which, $s_3$, meshes with central pinion P, while the other one, $s_4$, meshes with annulus Q. As a result, the planet-carrier $M_1$ and the planet-wheel $s_4$ act differentially upon annulus Q to rotate the same in the same direction as planet-carrier $M_1$. Annulus Q is thus driven at a speed which is demultiplied with respect to that of the prime driving shaft $M_0$.

On the other hand, the planet-carrier $M_1$ can be directly made rotatively fast, assuming pinion P is not held stationary, with the sun-wheel of the auxiliary epicyclic assembly through a friction interconnecting device E. The driven wheel of the auxiliary epicyclic assembly is then rotated at the same speed and in the same direction as the prime driving shaft $M_0$.

In Figs. 1 and 2, the device E is interposed between the planet-carrier $M_1$ and the driven wheel; this arrangement has the advantage of providing direct drive without exerting stresses upon the toothings of the members of the auxiliary epicyclic assembly.

In Figs. 3 and 4, the direct drive in the auxiliary assembly is obtained by clutching together the planet-carrier $M_1$ and pinion P; this arrangement has the advantage that pinion P does not remain loose when said pinion is not held stationary.

The main epicyclic assembly is designed and operates as described in the above mentioned patent, i. e. the second central wheel C may be selectively made stationary by a friction device at C' or used as a driving member, the planet-carrier A is adapted to be held stationary by a friction device A' or A' and A" and the second annulus B, if provided, is also adapted to be held stationary by a friction device at B'.

In the embodiments shown, a friction interconnecting device E' is provided to make pinion C rotatively fast with the planet-carrier $M_1$, which is, in turn, rotatively fast with $M_0$, which permits rotating pinion C in the same direction and at the same speed as said prime driving shaft $M_0$. If, in these conditions, pinion M is also driven at said speed, which takes place, as described above, when, pinion P being free, the friction interconnecting device E is operated, both central wheels M and C of the main epicyclic assembly rotate as a whole, which determines a general direct drive, whereby the ultimate driven shaft $R_0$ is rotated in the same direction and at the same speed as the prime driving shaft $M_0$.

If, however, central wheel C being clutched, pinion P is held stationary, only said central wheel C is driven at the same speed as the prime driving shaft $M_0$, while the other central wheel M is driven at a speed which is either multiplied or demultiplied with respect to that of the prime driving shaft $M_0$, as exposed above. As a result, the ultimate driven shaft $R_0$ is rotated at a speed which is intermediate between that of the prime driving shaft $M_0$ and that of the central wheel M.

On the other hand, if, in the same conditions, the planet-carrier A of the main epicyclic assembly is held stationary instead of pinion P, a first back drive speed is obtained, while, if annulus B is held stationary instead of the planet-carrier A, a second back drive speed is obtained. In all other cases according as whether the auxiliary epicyclic assembly is in direct drive or not, the speed of the ultimate driven shaft will be that resulting from the ratio provided by the main epicyclic assembly or from the same ratio multiplied or demultiplied by means of the auxiliary epicyclic assembly.

Eventually, if the main epicyclic assembly has one single annulus R, as shown in Figs. 1 and 2, there are provided six forward speeds including direct drive and one back drive speed, while if the main epicyclic assembly has two annuli, as shown in Figs. 3 and 4, there are provided eight forward speeds including direct drive and two back drive speeds.

As an illustration, the following tables give, for specific numbers of teeth of the members of the auxiliary and main epicyclic assemblies, the speed ratios which can be obtained in the various embodiments shown in the drawings:

*Figure 1*

Numbers of teeth:
$P=17$
$Q=57$ } corresponding to a multiplying ratio of 1.3
$M=28$
$C=32$
$R=70$ Speed ratios provided:
Forward drive—
0.4
0.52
0.68
0.88
1
1.2
Back drive—(—0.45)

*Figure 2*

Numbers of teeth:
$P=21$
$s_1=27$
$s_2=15$ } corresponding to a demultiplying ratio of 0.80
$P_1=33$
$M=23$
$C=15$
$R=71$ Speed ratios provided:
Forward drive—
0.259
0.324
0.590
0.733
0.85
1
Back drive—(—0.211)

*Figure 3*

Numbers of teeth:
$P=22$
$s=20$ } corresponding to a multiplying ratio of
$Q=62$ } 1.355
$M=17$
$C=21$
$m=34$
$r=22$
$R=73$
$c=30$
$B=85$ Speed ratios provided:
 Forward drive—
  0.17
  0.23
  0.31
  0.42
  0.55
  0.75
  1
  1.20
 Back drive—
  (—0.21)
  (—0.61)

Figure 4

Numbers of teeth:
 $P=18$
 $s_3$=any number
 $s_4$=any number
 $Q=90$
 $M=23$
 $C=15$
 $R=71$
 $B=67$ corresponding to a demultiplying ratio of 0.80

Speed ratios provided:
 Forward drive—
  0.259
  0.324
  0.40
  0.50
  0.590
  0.733
  0.85
  1
 Back drive—
  (—0.211)
  (—0.56)

It will be seen that, in the constructive embodiment shown in Fig. 3, a planet-wheel provided with two toothings of different pitch diameters $c$ and $r$ is interposed between the central wheel C and the annulus R, which permits limiting, other things being equal, the diameter of said annulus, and housing under toothing $r$ the bearing which is provided to center the downstream flange of the planet-carrier A on the shaft of the central wheel M.

It is thus possible to reduce both the diametral and axial dimensions of casing S in which, as shown in Fig. 3, all elements of the gear-box are enclosed as an extremely compact assembly.

In Figs. 2 and 4, that planet-wheel which meshes with the central wheel C and annulus R is provided with a wide mid-groove, which permits using a central wheel M having a larger diameter than central wheel C.

While the invention has been described with particular reference to preferred embodiments, it is not intended to limit the scope of the invention to the embodiments illustrated, nor otherwise than by the terms of the subjoined claims.

In particular, in the embodiment of Fig. 4, in order to obtain a suitable demultiplying ratio between pinion P and annulus Q, without giving to the ratio between the numbers of teeth of said members a prohibitive value, either planet-wheel ($s_3$ or $s_4$) may be substituted for by a planet-wheel having two toothings of different pitch diameters such as $s_1$—$s_2$ used in Fig. 2.

Similarly, without modifying the conditions of interconnection between the auxiliary and main epicyclic assemblies, the connections and functions of pinion P and annulus Q could be interchanged, which would permit obtaining a smaller demultiplying ratio between the prime driving shaft and the driving member of the main epicyclic assembly.

Furthermore, the use of a step planet-wheel in the main epicyclic assembly, shown in the constructive embodiment of Fig. 3, could be also adopted in the other embodiments.

In certain cases, it would be even possible to use one or more sets of two step planet-wheels meshing together and each interposed between one central wheel of the main epicyclic assembly and one annulus thereof.

What is claimed is:

1. An epicyclic change speed gear comprising a driving shaft and a driven shaft having a common axis, a main gear train comprising at least four coaxial members including a first central wheel, a second central wheel loosely mounted on its axle, an innerly toothed crown wheel fast with the driven shaft and a planet carrier loosely mounted on its axle and carrying at least two intermeshing planet pinions, one of which also meshes with said second central wheel and with said crown wheel, a secondary gear train comprising three coaxial members including an additional loose central wheel, a second planet carrier fast with the driving shaft and a toothed wheel rotatively fast with said first central wheel of the main gear train, said second planet carrier carrying planet gear means operatively engaged with said additional loose central wheel of the secondary gear train and with said toothed wheel fast with said first central wheel, means to prevent selectively said loose members of the main and secondary gear trains from rotating, means to make said second central wheel of the main train rotatively fast with said second planet carrier, and means to make said second planet carrier rotatively fast with one of the two other coaxial members of the secondary gear train.

2. An epicyclic change speed gear comprising a driving shaft and a driven shaft having a common axis, a main gear train comprising at least four coaxial members including a first central wheel, a second central wheel loosely mounted on its axle, an innerly toothed crown wheel fast with the driven shaft and a planet carrier loosely mounted on its axle and carrying at least two intermeshing planet pinions, one of which also meshes with said second central wheel and with said crown wheel, a casing, a secondary gear train comprising three coaxial members including an additional loose central wheel, a second planet carrier fast with the driving shaft and a toothed wheel rotatively fast with said first central wheel of the main gear train, said second planet carrier carrying planet gear means operatively engaged with said additional loose central wheel and with said toothed wheel fast with said first central wheel, and five friction interconnecting devices interposed between said additional loose central wheel and said casing, between the planet carrier of the secondary gear train and one of the coaxial wheels thereof, between the planet carrier of the main gear train and the casing, between the planet carrier of the secondary gear train and the second central wheel of the main gear train, and between said second central wheel of the main gear train and the casing, respectively, whereby the selective operation of two of said five friction interconnecting devices permits obtaining, neglecting the combinations corresponding to the simultaneous operation of two interconnecting devices cooperating with the casing, six forward speeds including direct drive and constituting a very progressive range and a back drive speed, the absolute value of which is substantially equal to that of the lowermost forward speed.

3. A speed changing device according to claim 2, in which each one of said five friction interconnecting devices is constituted by an electro-magnet secured on one of the two members to interconnect, the armature of said electro-magnet being secured on the other one of said two members, whereby each one of said forward and back speeds is obtained by simultaneously energizing two of said electro-magnets.

4. A speed changing gear comprising, in combination, a fixed casing, a driving shaft and a driven shaft in axial alignment; a main epicyclic assembly including four coaxial members, viz. a first central wheel, a second central wheel, a planet-carrier carrying at least one set of two planet wheels meshing together and each meshing with one of said central wheels, a first internal toothed annulus gearing with that planet wheel which meshes with said second central wheel, said annulus being fixedly fast in rotation with said driven shaft and a second internally toothed annulus meshing with the other planet wheel; an auxiliary epicyclic assembly including three coaxial members, viz. a first loose sun wheel, a second planet-carrier fixedly fast in rotation with said driving shaft and an internally toothed crown wheel fixedly fast in rotation with said first central wheel; said second planet-carrier carrying planetary pinions meshing with said sun wheel and with said innerly toothed crown wheel; and six friction interconnecting devices interposed between said loose sun wheel and casing, between the planet-carrier of the auxiliary assembly and the said loose sun wheel, between the planet-carrier of the auxiliary assembly and the second central wheel of the main assembly, between said second central wheel and casing, between the planet-carrier of the main assembly and the casing and between said second annulus and casing, respectively, whereby the selective operation of two of said six friction interconnecting devices permits obtaining, neglecting the combinations corresponding to the simultaneous operation of two interconnecting devices cooperating with the casing, eight forward speeds including direct drive and constituting a very progressive range and two back drive speeds the lowest of which has an absolute value substantially equal to that of the lowermost forward speed.

5. The speed change gearing defined by claim 1 wherein the second loose central wheel of said secondary train comprises a loose sun wheel and the toothed wheel rotatively fast with the first central wheel of the main train comprises a second sun wheel.

6. A speed changing device according to claim 1 in which one of said two planet wheels crosses over the area in which the other planet wheel meshes with one central wheel and one annulus, said first mentioned planet wheel having a hub cut away so as to avoid the teeth of said central wheel and said annulus.

7. A speed changing gear comprising, in combination, a fixed casing, a driving shaft and a driven shaft in axial alignment, a main epicyclic assembly including four coaxial members, viz. a first central wheel, a second central wheel, a planet-carrier carrying at least one set of two planet wheels meshing together and each meshing with one of said central wheels, a first internal-toothed annulus gearing with that planet wheel which meshes with said second central wheel, said annulus being fixedly fast in rotation with said driven shaft and a second internal-toothed annulus meshing with the other planet wheel; auxiliary epicyclic assembly including three coaxial members, viz. a loose central pinion, an internal-toothed annulus fixedly fast in rotation with the first central wheel of said main epicyclic assembly and a planet carrier fixedly fast in rotation with said driving shaft and carrying at least one set of two planet wheels meshing together and one of which meshes with said loose central pinion while the other one meshes with said last mentioned annulus; and six friction interconnecting devices interposed between said loose central pinion and casing, between the planet carrier of the auxiliary assembly and said loose central pinion, between the planet carrier of the auxiliary assembly and the second central wheel of the main assembly, between said second central wheel and casing, between the planet carrier of the main assembly and the casing and between said second annulus and casing, respectively.

8. The change speed gearing defined by claim 1 wherein the planet carrier of said secondary gear train carries at least one planet wheel having two toothings of different pitch diameters, the said additional loose central wheel of the secondary gear train meshes with one of the said toothings and the said toothed wheel of the secondary train meshes with the other of the two toothings and is fixedly fast in rotation with the first central wheel of the main gear train.

9. The change speed gearing defined by claim 1 wherein the toothed wheel of said secondary gear train comprises an internally toothed annulus fixedly fast in rotation with the first central wheel of the main train.

10. The apparatus defined by claim 1 wherein the toothed wheel of the secondary gear train comprises an internally toothed annulus fixedly fast in rotation with the first central wheel of the main gear train, and six friction interconnecting devices are interposed between the second loose central wheel of the secondary train and the casing, between the planet carrier of the secondary train and the second loose central wheel, between the planet carrier of the secondary gear train and the second central wheel of the main gear train, between the second central wheel of the main gear train and the casing, between the planet carrier of the main gear train and the casing, and between said second annulus and the casing, respectively.

11. A multispeed transmission for vehicles comprising an input shaft; an output shaft; input and output plantary gear groups connected in series between said shafts, each of said groups having a plurality of gear elements; the output group having first and second input elements, the input group having first and second output elements, the input group having an input element drivingly connected to said input shaft and the output group having an output element drivingly connected to said output shaft; means directly and rigidly connecting the first output element of said input group to drive the first input element of said output group; one of said groups having a pair of reaction elements and the other group having at least one additional reaction element; first and second controllable devices for respectively holding the pair of reaction elements of said one group against rotation in order respectively to provide major and minor forward speed reductions therein; a third controllable device for holding said additional reaction element of said other group against rotation in order to provide a forward speed reduction therein; means including a fourth controllable device for locking together two of the elements of one of said groups in order to provide a direct drive therethrough; and means including a fifth controllable device for connecting the second output element of the input group to the second input element of the output group; said controllable devices being selectively operable in different pairs to provide a direct drive, at least four forward underspeed ratios and a reverse drive between said input and output shafts.

12. A multispeed transmission for vehicles comprising an input shaft; an output shaft; input and output plantary gear groups connected in series between said shafts, each of said groups having a plurality of gear elements; the output group having first and second input elements, the input group having first and second output elements, the input group having an input element drivingly connected to said input shaft and the output group having an output element drivingly connected to said output shaft; means directly and rigidly connecting the first output element of said input group to drive the first input element of said output group; one of said groups having a pair of reaction elements and the other group having at least one additional reaction element; first and second controllable devices for respectively holding the reaction elements of said one group against rotation in order respectively to provide major and minor forward speed reductions therein; a third controllable device for holding said additional reaction element of said other group against rotation in order to provide a forward speed reduction therein; means including a fourth controllable device for locking together two of the elements of one of said groups in order to provide a direct drive therethrough; and means including a fifth controllable device for connecting the second output element of the input group to the second input element of the output group; the input and output groups being locked together to provide direct drive between said input and output shafts when said fourth and fifth devices are simultaneously applied; said fifth controllable device, when applied separately from said fourth device and when applied simultaneously with one of the controllable devices associated with the input group, being effective to provide a dual flow of power from said input group to said output group; said controllable devices being selectively operable in different pairs to provide the direct drive, at least four forward underspeed ratios and a reverse drive between said input and output shafts.

13. A multispeed transmission for vehicles comprising an input shaft; an output shaft; input and output planetary gear groups connected in series between said shafts, each of said groups having a plurality of gear elements; the output group having first and second input elements, the input group having first and second output elements, the input group having an input element drivingly connected to said input shaft and the output group having an output element drivingly connected to said output shaft; means directly and rigidly connecting the first output element of said input group to drive the first input element of said output group; the output group having a pair of reaction elements and the input group having at least one additional reaction element; means including first and second controllable devices for respectively holding the reaction elements of said output group against rotation in order respectively to provide major and minor forward speed reductions therein; means including a third controllable device for holding said additional reaction element of said input group against rotation in order to provide a forward speed reduction therein; means including a fourth controllable device for locking together two of the elements of the input group in order to provide a direct drive therethrough; and means including a fifth controllable device for connecting the second output element of the input group to the second input element of the output group; said controllable devices being selectively operable in different pairs to provide a direct drive, at least four forward underspeed ratios and a reverse drive between said input and output shafts.

14. A multispeed transmission for vehicles comprising an input shaft; an output shaft; input and output planetary gear groups connected in series between said shafts, each of said groups having a plurality of gear elements; the output group having first and second input elements, the input group having first and second output elements, the input group having an input element drivingly connected to said input shaft and the output group having an output element drivingly connected to said output shaft; means directly and rigidly connecting the first output element of said input group to drive the first input element of said output group; the output group having a pair of reaction elements and the input group having at least one additional reaction element; means including first and second controllable devices for respectively holding the reaction elements of said output group against rotation in order respectively to provide major and minor forward speed reductions therein; means including a third controllable device for holding said additional reaction element of said input group against rotation in order to provide a forward speed reduction therein; means including a fourth controllable device for locking together two of the elements of the input group in order to provide a direct drive therethrough; and means including a fifth controllable device for connecting the second output element of the input group to the second input element of the output group; the input and output groups being locked together to provide direct drive between said input and output shafts when said fourth and fifth devices are simultaneously applied; said fifth controllable device, when applied separately from said fourth device and simultaneously with said third device, being effective to provide a dual flow of power from said input group to said output group; said controllable devices being selectively operable in different pairs to provide a direct drive, at least four forward underspeed ratios and a reverse drive between said input and output shafts.

15. In a transmission; the combination of a drive shaft; a driven shaft; a first planetary gear set and a second planetary gear set connected in combination between said shafts to drive said driven shaft at a plurality of different speeds and torques with respect to said drive shaft; said first planetary gear set having an input element driven by said drive shaft, first and second output elements and at least one reaction element; said second planetary gear set having a first input element connected with the first output element of said first planetary gear set, an output element connected to the driven shaft and first and second reaction elements; first clutch means for locking together two of the elements of said first set to establish direct drive through the first set; second clutch means for locking the second output element of said first planetary gear set and the first reaction element of said second planetary gear set; first brake means for holding the reaction element of said first planetary gear set and second and third brake means for selectively holding each of the reaction elements in said second planetary gear set; said clutch means and brake means being engageable in different pairs in order to complete at least five different forward speed ratios and a reverse drive between said drive shaft and said driven shaft.

16. In a transmission; the combination of a drive shaft; a driven shaft; a first planetary gear set and a second planetary gear set connected in tandem between said shafts to drive said driven shaft at a plurality of different speeds and torques with respect to said drive shaft; said first planetary gear set having an input element driven by said drive shaft, first and second output elements and at least one reaction element; said second planetary gear set having a first input element connected with the first output element of said first planetary gear set, an output element connected to the driven shaft and first and second reaction elements; first clutch means for locking together two of the elements of said first set to establish direct drive through the first set; second clutch means for locking the second output element of said first planetary gear set and the first reaction element of said second planetary gear set; first brake means for holding the reaction element of said first planetary gear set and second and third brake means for selectively holding each of the reaction elements in said second planetary gear set; direct drive between said drive and driven shafts being established by simultaneous application of said first and second clutch means; said clutch means and brake means being engageable in different pairs in order to complete said direct drive and at least four additional underspeed forward ratios and a reverse drive between said drive shaft and said driven shaft.

17. In a transmission; the combination of a drive shaft; a driven shaft; a first planetary gear set and a second planetary gear set connected in tandem between said shafts to drive said driven shaft at a plurality of different speeds and torques with respect to said drive shaft; said first planetary gear set having an input element driven by said drive shaft, first and second output elements and at least one reaction element; said second planetary gear set having a first input element connected with the first output element of said first planetary gear set, an output element connected to the driven shaft and first and second reaction elements; first clutch means for locking together two of the elements of said first set to establish direct drive through the first set; second clutch means for locking the second output element of said first planetary gear set and the first reaction element of said second planetary gear set; first brake means for holding the reaction element of said first planetary gear set and second and third brake means for selectively holding each of the reaction elements in said second planetary gear set; said clutch means and brake means being engageable in different pairs in order to complete at least five different forward speed ratios and a reverse drive ratio between said drive shaft and said driven shaft, one of said ratios being effected by simultaneous application of said first brake means and said second clutch means to effect a split path of power flow from the first planetary gear set to the second planetary gear set, and the highest of the forward ratios being a direct drive effected by simultaneous application of said first and second clutch means.

18. A multispeed transmission for vehicles comprising a driven input shaft; an output shaft; two planetary gear sets connected in series between said shafts; the first planetary gear set comprising a plurality of elements including an input element connected to and driven by said input shaft and a reaction element; a first brake for holding the reaction element of said first set against rotation in order to provide a speed reduction therethrough; means including a first clutch interconnecting two of the elements of said first set in order selectively to lock up said first set and provide a direct drive therethrough; two of the elements of said first set comprising first and second output elements; an intermediate shaft disposed between and coaxial with said input and output shafts and rigidly connected to be driven by a first of said output elements of said first set; said second gear set comprising a plurality of elements including first and second input gear elements, the first input gear element being fixedly connected to and driven by said intermediate shaft, a pair of planet pinions meshing with each other and one of which meshes with said first input element of the second gear set, a planet carrier element for said planet pinions and a third gear element meshing with one of said planet pinions; one of the elements of said second set comprising an output element and being drivingly connected directly to said output shaft; a second brake for holding the third gear element of said second set against rotation in order to provide a first speed reduction therethrough; a third brake for holding the second input gear element of said second set against rotation in order to provide a second speed reduction therethrough; means including a second clutch interconnecting the second output element of the first gear set and the second input gear element of the second set to provide a forward speed reduction under certain conditions and a reverse drive under other conditions; said brakes and clutches being selectively engageable in different pairs to establish at least five forward speed ratios and a reverse drive between said input and output shafts.

19. A multispeed transmission for vehicles comprising a driven input shaft; an output shaft; two planetary gear sets connected in series between said shafts; the first planetary gear set comprising a plurality of elements including an input element connected to and driven by said input shaft and a reaction element; a first brake for holding the reaction element of said first set against rotation in order to provide a speed reduction therethrough; means including a first clutch interconnecting two of the elements of said first set in order selectively to lock up said first set and provide a direct drive therethrough; two of the elements of first set comprising first and second output elements; an intermediate shaft disposed between and coaxial with said input and output shafts and rigidly connected to be driven by a first of said output elements of said first set; said second gear set comprising a plurality of elements including first and second input gear elements, the first input gear element being fixedly connected to and driven by said intermediate shaft, a pair of planet pinions meshing with each other and one of which meshes with said first input element of the second gear set, a planet carrier element for said planet pinions and a third gear element meshing with one of said planet pinions; one of the elements of said second set comprising an output element and being drivingly connected directly to said output shaft; a second brake for holding the third gear element of said second set against rotation in order to provide a first speed reduction therethrough; a third brake for holding the second input gear element of said second set against rotation in order to provide a second speed reduction therethrough; means including a second clutch interconnecting the second output element of the first gear set and the second input gear element of the second set; said second clutch being engageable to provide a dual path of power flow from said first set to said second set when applied simultaneously with said first brake to produce a forward speed reduction under certain conditions and a reverse drive under other conditions; said second clutch also being engageable to lock said second set to said first set when applied simultaneously with said first clutch, thereby effecting a direct drive from said input shaft to said output shaft; said brakes and clutches being selectively engageable in different pairs to establish the direct drive, at least four additional forward underspeed ratios and a reverse drive between said input and output shafts.

20. A multispeed transmission for vehicles comprising a driven input shaft; an output shaft; two double pinion type planetary gear sets connected in series between said shafts; the first planetary gear set comprising a plurality of elements one of which is an input element connected to and driven by said input shaft, said elements comprising a planet carrier mounting at least one pair of planet pinions meshing with each other, a ring gear meshing with one of said planet pinions and a sun gear meshing with the other of said planet pinions; a first brake for holding one of the elements of said first set against rotation in order to provide a speed reduction therethrough; means including a first clutch interconnecting two of the elements of said first set in order selectively to lock up said first set and provide a direct drive therethrough; two of the elements of said first set comprising first and second output elements; an intermediate shaft disposed between and coaxial with said input and output shafts and rigidly connected to be driven by a first of said output elements of said first set; said second gear set comprising a plurality of elements including first and second input gear elements, the first input gear element being fixedly connected to and driven by said intermediate shaft, a pair of planet pinions meshing with each other and one of which meshes with said first input element, a planet carrier element for said planet pinions and a third gear element meshing with one of said planet pinions; one of the elements of said second set comprising an output element and being drivingly connected directly to said output shaft; a second brake for holding the third gear element of said second set against rotation in order to provide a first speed reduction therethrough; a third brake for holding the second input gear element of said second set against rotation in order to provide a second speed reduction therethrough; means including a second clutch interconnecting the second output element of the first gear set and the second input gear element of the second set; said brakes and clutches being selectively engageable in different pairs to establish at least five forward speed ratios and a reverse drive between said input and output shafts.

21. A multispeed transmission for vehicles comprising a driven input shaft; an output shaft; two double pinion type planetary gear sets connected in series between said shafts; the first planetary gear set comprising a plurality of elements one of which is an input element connected to and driven by said input shaft, said elements including a planet carrier mounting at least one pair of planet pinions meshing with each other, a ring gear meshing with one of said planet pinions and a sun gear meshing with the other of said planet pinions; a first brake for holding one of the elements of said first set against rotation in order to provide a speed reduction therethrough; means including a first clutch interconnecting two of the elements of said first set in order selectively to lock up said first set and provide a direct drive therethrough; two of the elements of said first set comprising first and second output elements; an intermediate shaft disposed between and coaxial with said input and output shafts and rigidly connected to be driven by the first of said output elements of said first set; said second gear set comprising a plurality of elements including first and second input gear elements, the first input gear element being fixedly connected to and driven by said intermediate shaft, a pair of planet pinions meshing with each other and one of which meshes with said first input element and the other of which meshes with said second input gear element, a planet carrier element for said planet pinions and a third gear element meshing with one of said planet pinions; one of the elements of said second set comprising an output element and being drivingly connected directly to said output shaft; a second brake for holding the third gear element of said second set against rotation in order to provide a first speed reduction therethrough; a third brake for holding the second input gear element of said second set against rotation in order to provide a second speed reduction therethrough; means including a second clutch interconnecting the second output element of the first gear set and the second input gear element of the second set; said second clutch being engageable to provide a dual path of power flow from said first set to said second set when applied simultaneously with said first brake; said second clutch also being engageable to lock said second set to said first set when applied simultaneously with said first clutch, thereby effecting a direct drive from said input shaft to said output shaft; said brakes and clutches being selectively engageable in different pairs to establish the direct drive, at least four additional underspeed forward drives and a reverse drive between said input and output shafts.

22. A multispeed transmission for vehicles comprising a driven input shaft; an output shaft; two double pinion type planetary gear sets connected in series between said shafts; the first planetary gear set comprising a plurality of elements one of which is an input element connected to and driven by said input shaft, said elements including a planet carrier mounting at least one pair of planet pinions meshing with each other, a ring gear meshing with one of said planet pinions and a sun gear meshing with the other of said planet pinions; a first controllable means for holding the sun gear of said first set against rotation in order to provide a speed reduction therethrough; means including a first clutch interconnecting two of the elements of said first set in order selectively to lock up said first set and provide a direct drive therethrough; the ring gear and one other element of said first set respectively comprising first and second output elements; an intermediate shaft disposed between and coaxial with said input and output shafts and rigidly connected to be driven by said ring gear; said second gear set comprising a plurality of elements including a first sun gear comprising a first input element to said second set and being fixedly connected to and driven by said intermediate shaft, a pair of planet pinions meshing with each other and one of which meshes with said first sun gear and the other of which meshes with a second sun gear, a planet carrier element for said planet pinions and a ring gear meshing with one of said planet pinions; the ring gear of said second set being drivingly connected directly to said output shafts; one of the elements of said second set comprising a second input element to said second set; a second controllable means for holding the second input element of said second set against rotation in order to provide a first speed reduction therethrough; a third controllable means for holding an additional element of said second set against rotation in order to provide a second speed reduction therethrough; means including a second clutch interconnecting the second output element of the first gear set and the second input element of the second set; said second clutch being engageable to lock said second set to said first set when applied simultaneously with said first clutch, thereby effecting a direct drive from said input shaft to said output shaft; said three controllable means and said two clutches being selectively engageable in different pairs to establish at least five forward speed ratios including the direct drive and a reverse drive ratio between said input and output shafts, one of said ratios being provided by a split flow of power between said first and second sets effected by said second clutch.

23. A multispeed transmission for vehicles comprising a driven input shaft; an output shaft; two double pinion type planetary gear sets connected in series between said shafts; the first planetary gear set comprising a plurality of elements one of which is an input element connected to and driven by said input shaft, said elements including a planet carrier mounting at least one pair of planet pinions meshing with each other, a ring gear meshing with one of said planet pinions and a sun gear meshing with the other of said planet pinions; a first controllable means for holding the sun gear of said first set against rotation in order to provide a speed reduction therethrough; means including a first cluch interconnecting two of the elements of said first set in order selectively to lock up said first set and provide a direct drive therethrough; the ring gear and planet carrier of said first set comprising a pair of output elements; an intermediate shaft disposed between and coaxial with said input and output shafts and rigidly connected to be driven by a first of said output elements of said first set; said second gear set comprising a plurality of elements including first and second input gear elements, the first input gear element being fixedly connected to and driven by said intermediate shaft, a pair of planet pinions meshing with each other and one of which meshes with said first input element and the other of which meshes with said second input gear element, a planet carrier element for said planet pinions and a third gear element meshing with one of said planet pinions; one of the elements of said second set comprising an output element and being drivingly connected directly to said output shaft; a second controllable means for holding the third gear element of said second set against rotation in order to provide a second speed reduction therethrough; means including a second clutch interconnecting the second output element of the first gear set and the second input gear element of the second set; said second clutch being engageable to lock said second set to said first set when applied simultaneously with said first clutch, thereby effecting a direct drive from said input shaft to said output shaft; said three controllable means and said two clutches being selectively engageable in different pairs to establish at least five forward speed ratios including the direct drive and a reverse drive ratio between said input and output shafts, one of said ratios being provided by a split flow of power between said first and second sets effected by application of said second clutch.

24. A multispeed transmission for vehicles comprising a driven input shaft; an output shaft, two double pinion type planetary gear sets connected in series between said shafts; the first planetary gear set comprising a plurality of elements one of which is an input element connected to and driven by said input shaft, said elements including a planet carrier mounting at least one pair of planet pinions meshing with each other, a ring gear meshing with one of said planet pinions and a sun gear meshing with the other of said planet pinions; first controllable means for holding the sun gear of said first set against rotation in order to provide a speed reduction therethrough; means including a first clutch interconnecting two of the elements of said first set in order selectively to lock up said first set and provide a direct drive therethrough; two of the elements of said first set respectively comprising first and second output elements; an intermediate shaft disposed between and coaxial with said input and output shafts and rigidly connected to be driven by the first of said output elements; said second gear set comprising a plurality of elements including a first sun gear comprising a first input element to said second set and being fixedly connected to and driven by said intermediate shaft, a pair of planet pinions meshing with each other and one of which meshes with said first sun gear and the other of which meshes with a second sun gear, a planet carrier element for said planet pinions and a ring gear meshing with one of said planet pinions; one of the elements of said second set being drivingly connected directly to said output shaft; a second controllable means for holding the second sun gear of said second set against rotation in order to provide a first speed reduction therethrough; a third controllable means for holding the ring gear of said second set against rotation in order to provide a second speed reduction therethrough; means including a second clutch interconnecting the second output element of the first gear set and the second sun gear of the second set; said second clutch being engageable to lock said second set to said first set when applied simultaneously with said first clutch, thereby effecting a direct drive from said input shaft to said output shaft; said three controllable means and said two clutches being selectively engageable in different pairs to establish at least five forward speed ratios including the direct drive and a reverse drive ratio between said input and output shafts; one of said ratios being provided by a split flow of power between said first and second sets effected by application of said second clutch.

25. A multispeed transmission for vehicles comprising a driven input shaft; an output shaft; two double pinion type planetary gear sets connected in series between said shafts; the first panetary gear set comprising a plurality of elements one of which is an input element connected to and driven by said input shaft, said elements including a planet carrier mounting at least one pair of planet pinions meshing with each other, a ring gear meshing with one of said planet pinions and a sun gear meshing with the other of said planet pinions; a first controllable means for holding the sun gear of said first set against rotation in order to provide a speed reduction therethrough; means including a first clutch interconnecting two of the elements of said first set in order selectively to lock up said first set and provide a direct drive therethrough; the ring gear and the planet carrier of said first set respectively comprising first and second output elements; an intermediate shaft disposed between and coaxial with said input and output shafts and rigidly connected to be driven by said ring gear; said second gear set comprising a plurality of elements including a first sun gear comprising a first input element to said second set and being fixedly connected to and driven by said intermediate shaft, a pair of planet pinions meshing with each other and one of which meshes with said first sun gear and the other of which meshes with a second sun gear, a planet carrier element for said planet pinions and a ring gear of said second set being drivingly connected directly to said output shaft; a second controllable means for holding the second sun gear of said second set against rotation in order to provide a first speed reduction therethrough; a third controllable means for holding the planet carrier element of said second set against rotation in order to provide a second speed reduction therethrough; means including a second clutch interconnecting the planet carrier element of the first gear set and the second sun gear of the second set; said second clutch being engageable to lock said second set to said first set when applied simultaneously with said first clutch, thereby effecting a direct drive from said input shaft to said output shaft; said three controllable means and said two clutches being selectively engageable in different pairs to establish at least five forward speed ratios including the direct drive and a reverse drive ratio between said input and output shafts, one of said ratios being provided by a split flow of power between said first and second sets effected by simultaneous application of said second clutch and said first controllable means.

26. A multispeed transmission for vehicles comprising a driven input shaft; an output shaft; two double pinion type planetary gear sets connected in series between said shafts; the first planetary gear set comprising a plurality of elements one of which is a planet carrier connected to and driven by said input shaft, planet pinions carried by said carrier one of which meshes with a first reaction element and the other of which meshes with a first output element; a first controllable means for holding the reaction element of said first set against rotation in order to provide a speed reduction therethrough; means including a first clutch interconnecting two of the elements of said first set in order selectively to lock up said first set and provide a direct drive therethrough; an intermediate shaft disposed between and coaxial with said input and output shafts and rigidly connected to be driven by said output element; said second gear set comprising a plurality of elements including a first sun gear forming a first input element to said second set and being fixedly connected to and driven by said intermediate shaft, a pair of planet pinions meshing with each other and one of which meshes with said first sun gear and the other of which meshes with a second sun gear, a planet carrier element for said planet pinions and a ring gear meshing with one of said planet pinions; the ring gear of said second set being drivingly connected directly to said output shaft; a second controllable means for holding the planet carrier of said second set against rotation in order to provide a first speed reduction therethrough; a third controllable means for holding the second sun gear of said second set against rotation in order to provide a second speed reduction therethrough; means including a second clutch interconnecting the planet carrier of the first gear set and the second sun gear of the second set; said second clutch being engageable to lock said second set to said first set when applied simultaneously with said first clutch, thereby effecting a direct drive from said input shaft to said output shaft; said three controllable means and said two clutches being selectively engageable in different pairs to establish at least five forward speed ratios including the direct drive and a reverse drive ratio between said input and output shafts, one of said ratios being provided by a split flow of power between said first and second sets effected by application of said second clutch simultaneously with said first controllable means.

27. In a transmission the combination comprising an input member, an output member, a first planetary gear set having a plurality of drive and drive receiving elements constructed and arranged to transmit torque through the first planetary gear set, a first one of said elements receiving power from said input member, a second planetary gear set having a plurality of drive and drive receiving elements constructed and arranged to transmit torque through the second planetary gear set, a first of the elements of the second set being connected to drive said output member, a second of the elements of the first gear set being connected in driving relation with a second element of the second planetary gear set, a selectively operable clutch for connecting a third element of the first gear set with a third element of the second gear set, means for holding one of said third elements stationary so that when said clutch is also engaged the third elements are simultaneously rendered reaction elements for completing a drive between said input member and said output member through said two planetary gear sets, and means for holding one of the elements of the said first gear set stationary for completing a drive between said input member and said output member when said clutch is also engaged during which drive power flows in dual paths between said two gear sets, one path being between said second elements and the other path being between said third elements.

No references cited.